United States Patent [19]

Keitel et al.

[11] Patent Number: 5,984,236

[45] Date of Patent: *Nov. 16, 1999

[54] MOMENTUM UNLOADING USING GIMBALED THRUSTERS

[76] Inventors: Keith F. Keitel, 1030 Tiverton Ave., Apt. 117, Los Angeles, Calif. 90024; Richard A. Noyola, 1534 Marcelina Ave., Apt. D, Torrance, Calif. 90501; John F. Yocum, Jr., 28717 Shire Oaks Dr., Rancho Palos Verdes, Calif. 90275; David K. Abernethy, 1233 Flores St., #105, Los Angeles, Calif. 90069; Bernard M. Anzel, 730 Bayonne St., El Segundo, Calif. 90245

[*] Notice: This patent issued on a continued prosecution application filed under 37 CFR 1.53(d), and is subject to the twenty year patent term provisions of 35 U.S.C. 154(a)(2).

[21] Appl. No.: 08/577,444

[22] Filed: Dec. 22, 1995

[51] Int. Cl.[6] ...................................................... B64G 1/26
[52] U.S. Cl. ...................... 244/164; 244/158 R; 244/165; 244/169
[58] Field of Search .................................. 244/168, 164, 244/165, 166, 171, 158 R; 364/459, 429.023

[56] References Cited

U.S. PATENT DOCUMENTS

| 4,010,921 | 3/1977 | Pistiner et al. | 244/165 |
| 4,730,798 | 3/1988 | Wertz . | |
| 4,746,085 | 5/1988 | Bruderk | 244/166 |
| 4,767,084 | 8/1988 | Chan et al. . | |
| 5,020,746 | 6/1991 | Anzel | 244/169 |
| 5,109,346 | 4/1992 | Wertz . | |
| 5,149,022 | 9/1992 | Flament | 244/164 |
| 5,349,532 | 9/1994 | Tilley . | |
| 5,400,252 | 3/1995 | Kazimi et al. | 364/459 |
| 5,443,231 | 8/1995 | Anzel . | |
| 5,459,669 | 10/1995 | Adsit et al. | 364/459 |
| 5,626,315 | 5/1997 | Flament et al. | 244/168 |
| 5,692,707 | 12/1997 | Smay . | |

*Primary Examiner*—Charles T. Jordan
*Assistant Examiner*—Tran Dinh
*Attorney, Agent, or Firm*—Terje Gudmestad; Georgann Grunebach; Michael W. Sales

[57] ABSTRACT

A method of simultaneously controlling East/West and North/South positioning and unloading momentum of a spacecraft while orbiting an object. The spacecraft has a thruster array and a momentum accumulator. The method entails moving said spacecraft towards a node of the orbit. At a predetermined position on the orbit, separate from the node, a thruster of the thruster array is fired so as to control the orbital position of the spacecraft. While the thruster is being fired, momentum is dumped from the momentum accumulator at the predetermined position so that any loss in control in the attitude of the spacecraft is reduced.

21 Claims, 6 Drawing Sheets

MOMENTUM UNLOADING USING GIMBALED THRUSTERS

BACKGROUND OF THE INVENTION

Currently, when a spacecraft, such as a satellite, is moving in an orbit about a planetary body, such as the Earth, the spacecraft encounters disturbances, such as solar wind. These disturbances, left unchecked, will create a series of impulses of momentum which will saturate the momentum accumulator which could cause a loss in attitude. The amount of deviation is directly related to the specific configuration of the spacecraft—the more symmetric a spacecraft is about its center of mass the amount of deviation is minimized. For example, the most severe configuration of satellite with a single reflector can result in the satellite encountering daily momentum accumulations in roll, pitch and yaw by amounts of 5, 10 and 5 Nms, respectively. In a more typical case of a satellite having two symmetrically mounted reflectors, momentum accumulation in roll, pitch and yaw can each amount to 5 Nms.

To counteract such accumulations of momentum, spacecraft employ momentum accumulators which store the momentum encountered by the spacecraft so that the effect of the momentum is minimized or reduced. Examples of well known momentum accumulators is a pyramid of reaction wheels or gimbaled momentum wheels.

These momentum accumulators, however, are unable to accumulate momentum without end. Eventually, the stored momentum needs to be dumped or unloaded during the orbit of the spacecraft. However, the manner in which a spacecraft performs thruster operations to remain in a desired orbit, known as stationkeeping, does have an effect on the momentum dumping capability of the spacecraft. Furthermore, in such stationkeeping, the dumping capability is maximized when the total daily burn time is maximum (maximum inclination delta-v) and when the burn time is distributed most symmetrically throughout the day (minimum eccentricity and longitudinal acceleration delta-v). The worst-case conditions for dumping capability are therefore the minimum-eccentricity control strategy with minimum north-south disturbance in the 17 year life cycle of a satellite and with maximum longitudinal acceleration.

Several stationkeeping methodologies are possible. For example, prior satellites have unloaded momentum simultaneous with North/South stationkeeping only by using thrusters mounted on the North face. Simultaneous control of East/West positioning is not contemplated with this method.

Another possible method of stationkeeping is described in U.S. Pat. No. 5,443,231 to Anzel. That application describes a method of East/West and North/South stationkeeping which uses four gimballed ion thrusters in the same configuration as shown in FIG. 2 of the present application.

In a third example, gimballed ion thrusters are mounted on the North face and the South face of a satellite for momentum unloading during North/South stationkeeping, such as described in U.S. Pat. No. 5,349,532 to Tilley et al. Again, East/West stationkeeping is not performed.

Furthermore, gimballed ion thrusters are used for North-South stationkeeping on the EUROSTAR Spacecraft. This spacecraft appears not to disclose momentum unloading nor the use of the system for East-West stationkeeping.

While the above-mentioned control systems are generally adequate for their intended purpose, there is room for improvement. For example, the fuel efficiency of the above-mentioned control systems is adversely affected because North/South and East/West stationkeeping and momentum dumping are not performed simultaneously. Furthermore, unloading of momentum is not done in an efficient manner by prioritizing which systems are activated to dump momentum.

SUMMARY OF THE INVENTION

The present invention provides a control system for controlling the orbital position of a spacecraft. The control system of the present invention is capable of controlling the orbital position of the spacecraft while simultaneously dumping momentum so as to increase the fuel efficiency of the spacecraft. In particular, the present invention concerns a method of simultaneously controlling East/West and North/South positioning and unloading momentum of a spacecraft while orbiting an object. The spacecraft has a thruster array and a momentum accumulator. The method entails moving said spacecraft towards a node of the orbit. At a predetermined position on the orbit, separate from the node, a thruster of the thruster array is fired so as to control the orbital position of the spacecraft. While the thruster is being fired, momentum is dumped from the momentum accumulator at the predetermined position so that any loss in control in the orbital position is reduced.

Another aspect of the present invention regards a method of simultaneously controlling East/West and North/South positioning and unloading momentum of a spacecraft while orbiting an object. The spacecraft has four thrusters and a momentum accumulator. The method entails moving the spacecraft towards a node of the orbit. One of the thrusters is fired at a predetermined position on the orbit, separate from the node, so as to control the orbital position of the spacecraft. While the thruster is being fired at the predetermined position, momentum is dumped from the momentum accumulator so that any loss in control in the orbital position is reduced.

A third aspect of the present invention is a spacecraft control system for simultaneously controlling East/West and North/South positioning and unloading momentum of a spacecraft while orbiting an object. The spacecraft control system includes
a spacecraft having a thruster array and a momentum accumulator. The system further includes a sensor for generating a signal representative when the spacecraft has arrived at a predetermined position on the orbit which is separate from a node of the orbit.
A momentum controller is provided which receives the signal and sends a signal to a thruster of the thruster array so that the thruster fires at the predetermined position in response to receipt of the signal so as to control the orbital position of the spacecraft. The momentum controller also sends a signal to the momentum accumulator to dump momentum at the predetermined position and while the thruster is being fired so that any loss in control in the orbital position is reduced.

The above-described control system of the present invention improves fuel efficiency on the spacecraft which allows a spacecraft to perform stationkeeping solely via ion propulsion thrusters and, thus, reduces the need for bipropellant fuel or thrusters. The disclosed control system efficiently unloads momentum by prioritizing which systems are activated to dump momentum.

The foregoing features and advantages of the present invention will be further understood upon consideration of the following detailed description of the invention taken in conjunction with the accompanying drawings, in which:

DESCRIPTION OF THE PREFERRED EMBODIMENT

Figure 1:
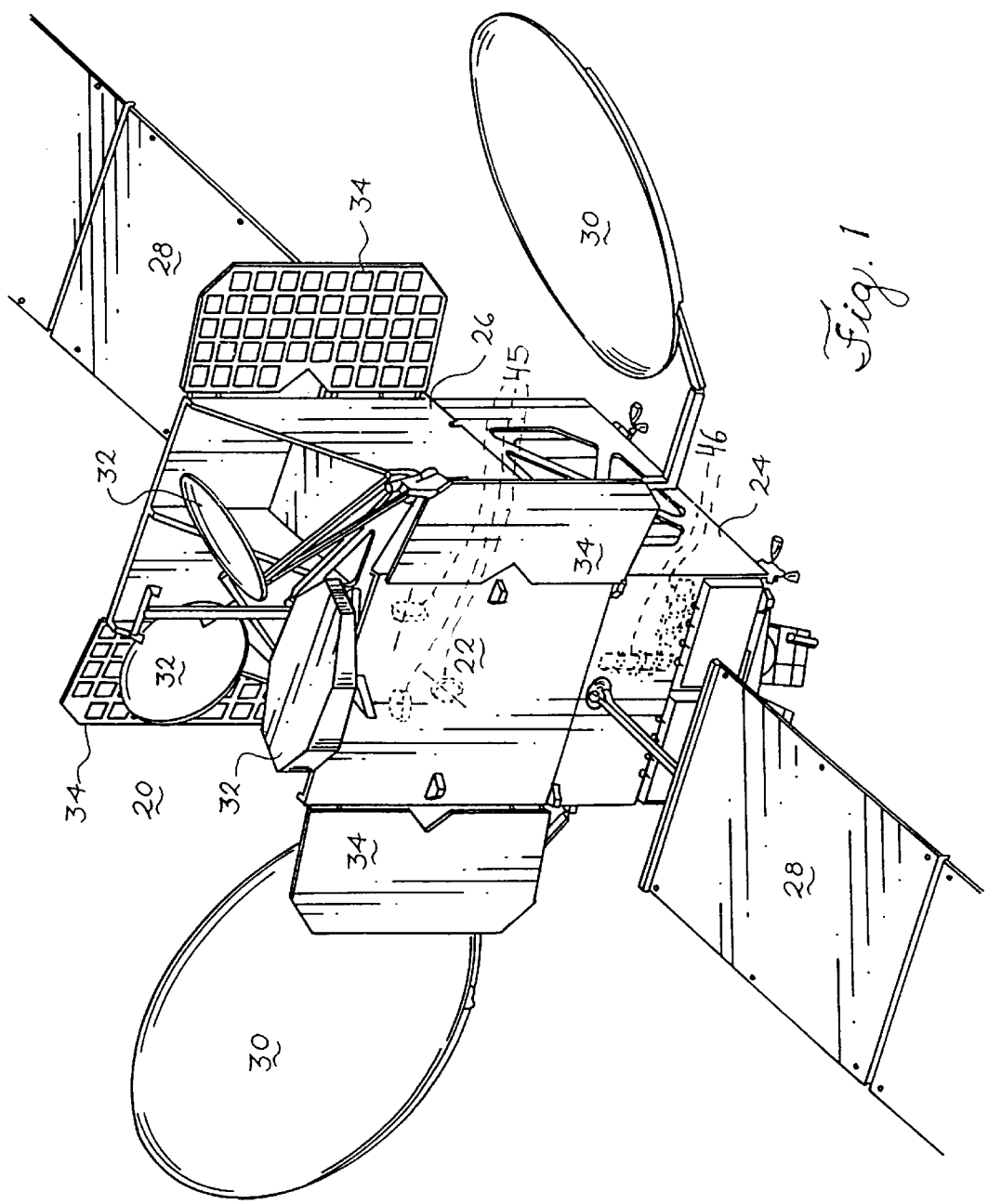
FIG. 1 shows a perspective view of a spacecraft capable of utilizing a stationkeeping and momentum dumping system and method of the present invention.

A spacecraft control system for controlling the stationkeeping and momentum dumping or unloading of a spacecraft or satellite 20 according to the present invention is substantially shown in FIGS. 1–10. Satellite 20 is a three axis-stabilized spacecraft having a spacecraft body 22 which includes a lower bus module 24 and an upper payload module 26. Attached to the aft end of the lower bus module 24 are a plurality of engines which will be discussed in detail later. Lower bus module 24 contains fuel tanks (not shown) and various power and control modules which operate the engines and power the payload module 26. Bus module 24 further includes a pair of solar panels 28 which convert sunlight into electricity which is sent to batteries (not shown) located on the bus module 24. Bus module 24 also has a pair of antennae 30, which receive signals from a ground station on Earth which are used to control the satellite. Antennae 30 also send signals to the ground station.

Payload module 26 is attached to the bus module 24 and contains a variety of electronic equipment which may contain a number of sensors 32. The electronic equipment processes information gathered by sensors 32 and sends the processed information back to the ground station via antennae 30. Payload module 26 further includes heat radiators 34 which emit heat generated by the satellite 20.

Figure 2:
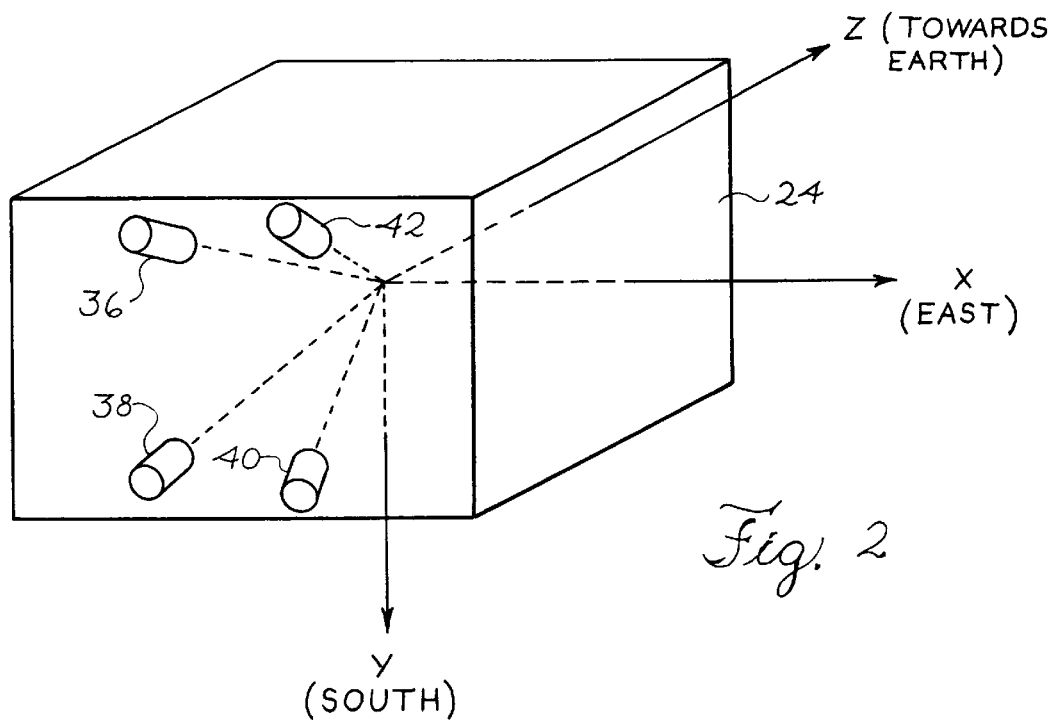
FIG. 2 shows a thruster configuration to be used with the spacecraft of FIG. 1.

As shown in FIGS. 1 and 2, spacecraft or satellite 20 has four thrusters 36, 38, 40, 42 mounted on the anti-nadir side of bus module 24. The orbit inclination, eccentricity, and rate mean motion of spacecraft 20 can be controlled by firing all of the thrusters 36, 38, 40 and 42 per day, where only one thruster is fired at a time at predetermined times and duration. All four of the thrusters are aligned such that their nominal thrust vectors are directed through the spacecraft center of mass as described in U.S. Pat. No. 5,443,231 to Anzel, whose contents are incorporated herein by reference. Each of the north and south thruster pairs are mounted on a thruster platform which includes a single two-axis gimbal mechanism 44 (see FIG. 3) such that the thrust vectors make an angle θ (typically 45°–55°) with the north-south axis being in a northerly and southerly direction, respectively. The thrusters are also separated in the east-west direction by an angle a (typically 10°–13°). Each thruster can produce a component of force or torque about all three axes. The thrusters can be gimballed to produce torques necessary to unload momentum from any storage devices, while simultaneously controlling East/West and North/South positioning of the spacecraft. Besides gimbaled thrusters 36, 38, 40 and 42, momentum stored in momentum accumulators 45, such as reaction or momentum wheels, can be dumped or unloaded by moving solar panels 28 or employing well known magnetic torquers 46 (schematically shown in FIG. 1). It should be noted that the momentum accumulators are the primary pointing control actuators.

Figure 3:
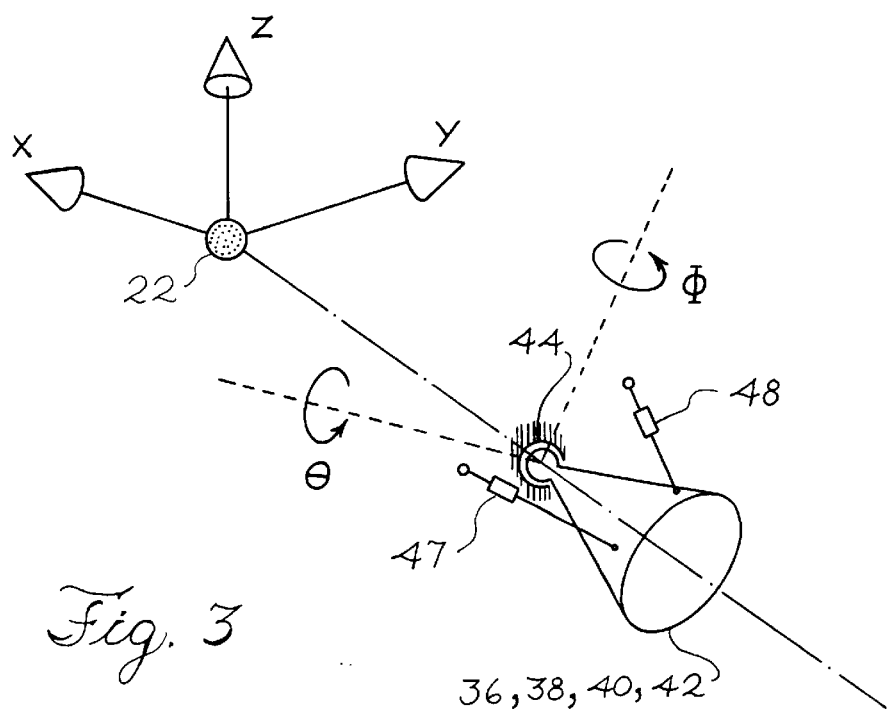
FIG. 3 shows a gimbaled thruster to be used with the thruster array of FIG. 2.

As shown in FIG. 3, each thruster is attached to a gimbaled mechanism 44 and a pair of actuators 47, 48. Each actuator 47, 48 can employ stepper motors mounted at right angles from each other so that the actuators 47, 48 can change their lengths in response to a control signal so as to control the angled position of the gimbaled thrusters 36, 38, 40, 42 in two orthogonal directions, θ, Φ. Each of the four thrusters 36, 38, 40 and 42 preferably is an electronic thruster, such as a xenon ion propulsion thruster.

Figure 5:
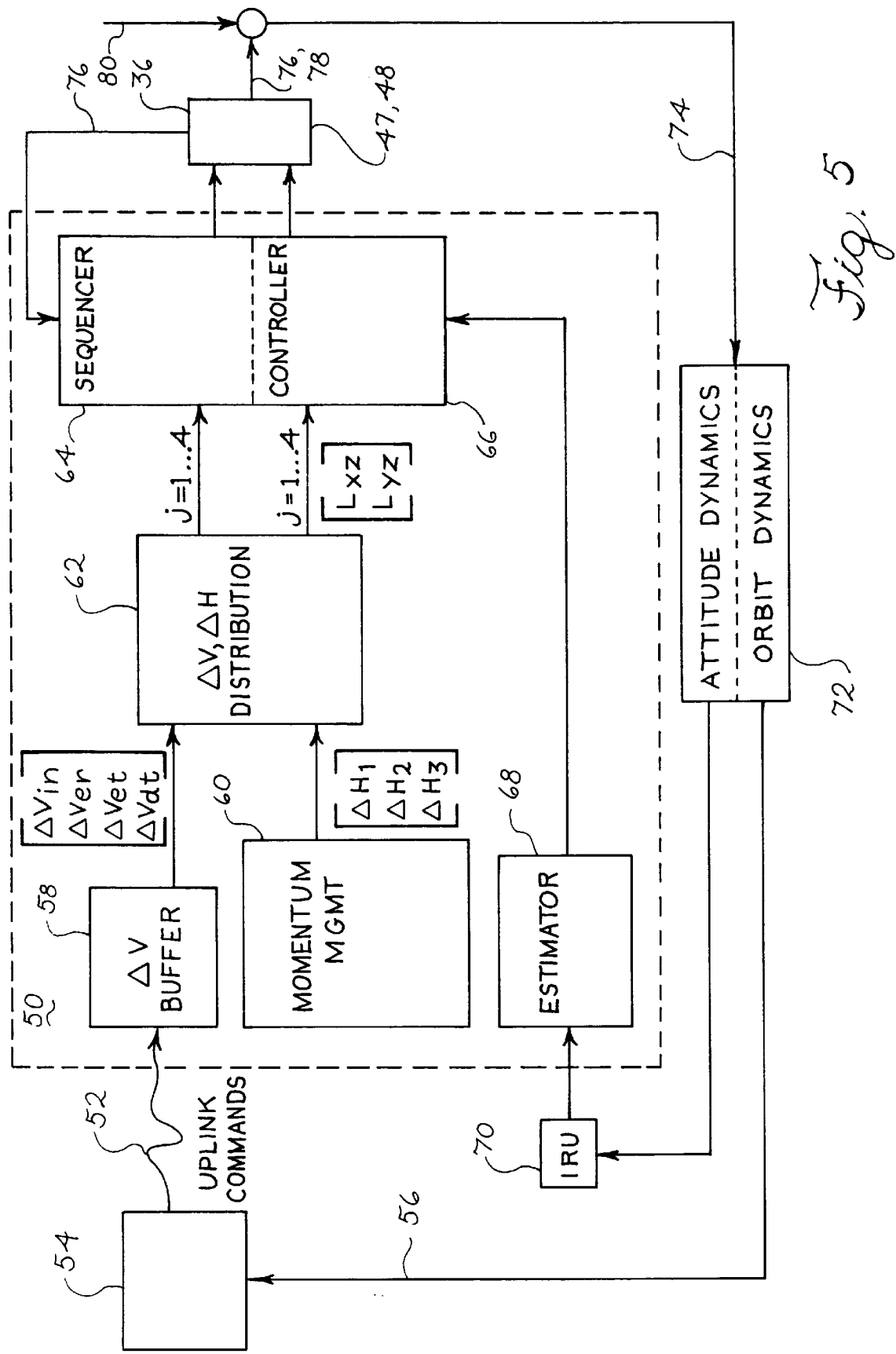
FIG. 5 schematically shows a stationkeeping and momentum dumping control system for the spacecraft of FIG. 1.

FIG. 5 schematically shows the structure of a momentum management system 50 which may utilize several actuators to counteract disturbance torques (such as from solar flux on the spacecraft) and to unload momentum from the momentum accumulators or storage devices 45. The momentum management system 50 ideally will be able to formulate and execute a strategy for using these burns, as defined from stationkeeping requirements, to dump the necessary disturbance momentum from the spacecraft with minimal impact to the stationkeeping capabilities and no additional fuel cost. Momentum management system 50 preferably comprises one or more microprocessors to perform the calculations and tasks outlined below. Furthermore, the entire momentum management system 50 can be located on board the spacecraft 20.

A first step in managing momentum on spacecraft 20 is for a ground station on the Earth to send commands 52 to satellite 20 which correspond to daily velocity changes, Δ V, to be performed over a period of time, such as a two week period, for stationkeeping. The Δ V changes are calculated at the ground station or on the spacecraft in a manner specified in U.S. Pat. No. 5,443,231. The calculations are based, in part, on feedback signals 56 sent from the satellite 20 to the ground station which represent the orbital dynamics of the satellite 20 in the previous two weeks.

Preferably, it would be desired that the satellite 20 would have sufficient processor ability to calculate both the stationkeeping and momentum dumping requirements of the satellite 20 without input from the ground station. This increases the robustness of the stationkeeping control system in the presence of changing disturbances and torques.

The Δ V changes sent to the satellite 20 are received by antennae 30 and relayed to a Δ V buffer 58 which stores fourteen days of Δ V changes. The values stored correspond to the variables Δ Vin, ΔVer, Δ Vet and ΔVdt which are described in U.S. Pat. No. 5,443,231, whose contents are incorporated herein by reference.

During the continuous operation of satellite 20, a momentum manager 60 monitors each of the on-board momentum accumulators and computes momentum unloading commands Δ $H_1$, Δ $H_2$, and Δ $H_3$ which represent the total momentum to be dumped in a 24 hour period along the X, Y and Z directions, respectively.

One method of calculating $\Delta H_1$, $\Delta H_2$, and $\Delta H_3$ is given below. This method is based on minimizing the thruster platform's gimbal extremes. This minimization is achieved at the cost of a higher transient momentum storage between burns, thereby increasing the necessary momentum margin which must be used in sizing the momentum wheels.

Figure 4:
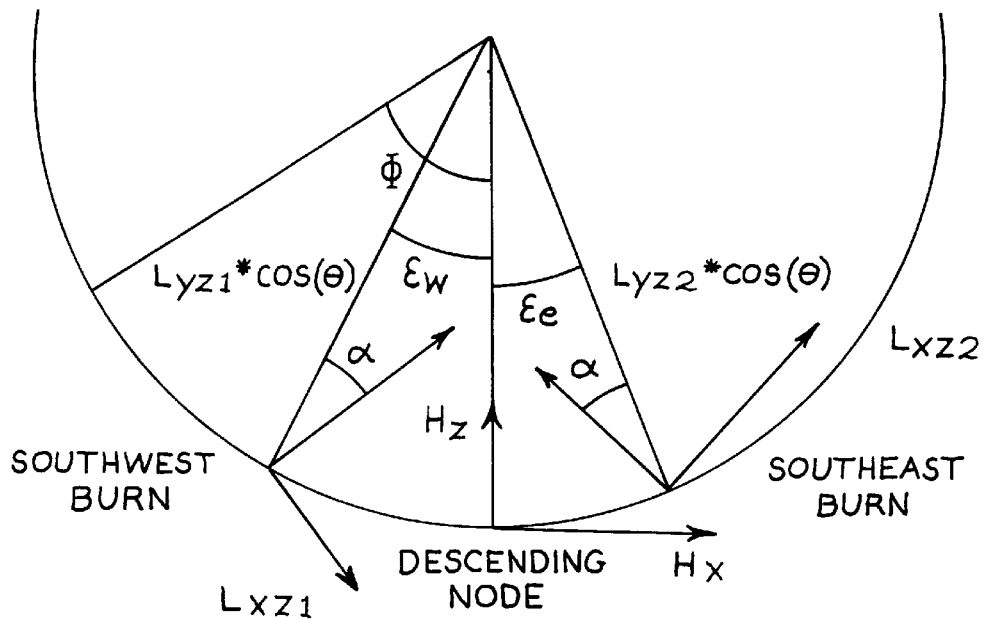
FIG. 4 shows an orbital burn sequence for the southwest and southeast burns for the spacecraft of FIG. 1.
Figure 6:
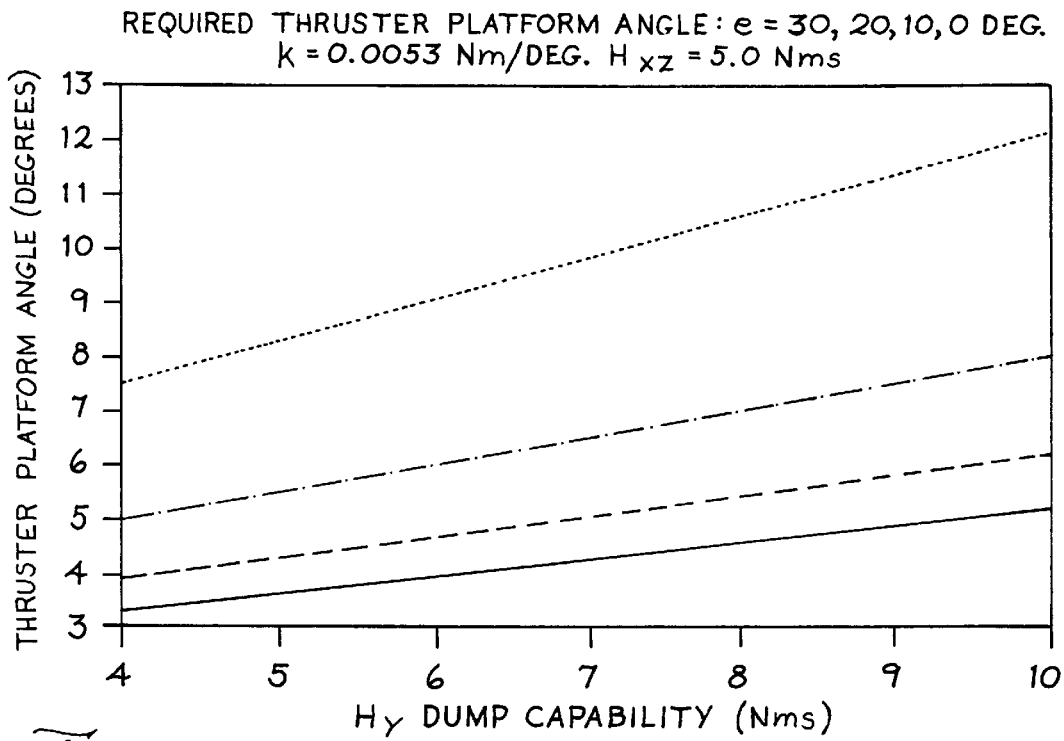
FIG. 6 shows the gimbal angle required to dump 5 Nms or roll/yaw momentum as a function of pitch momentum dumped daily.

Four burns, one burn per thruster, should be made during the travel of the satellite 20 along its orbit, if no thrusters have failed. The position of the burns is specified by momentum control 62. As shown in FIG. 4, as the satellite 20 nears the descending node of the orbit it will fire its southwest thruster 38 for a duration of time $D_1$ and at an angular position $\epsilon_w$. Similarly, there will be three other burns. One burn will involve firing the southeast thruster 40 for a duration $D_2$ on the other side of the descending node at $\epsilon_e$. After the second burn, the satellite 20 moves towards the ascending node where a burn of the northwest thruster 36 is performed at $\epsilon_w$ for duration $D_3$. After the satellite passes the ascending node, the final burn for the 24 hour period is performed at $\epsilon_e$ where a northeast thruster 42 is fired for a duration $D_4$. The values for $\epsilon_e$, $\epsilon_w$, $D_1$, $D_2$, $D_3$, $D_4$ are discussed in U.S. Pat. No. 5,443,231, whose contents are incorporated herein by reference. FIG. 6 shows the gimbal angles as a function of pitch momentum dumped daily. These results assume that the spacecraft is not offset in pitch.

Figure 7:
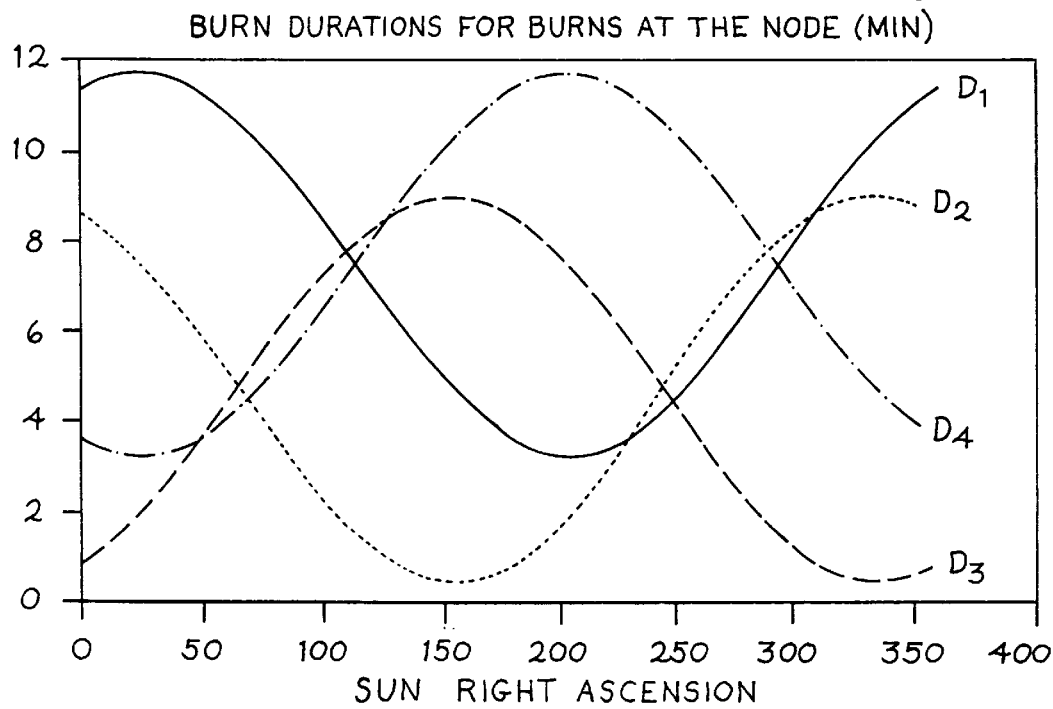
FIG. 7 shows a typical profile of burn durations throughout the year.

As shown in FIG. 7, the two quantities $(D_3+D_1)$ and $(D_4+D_2)$ are constant throughout the year. The resulting geometry allows for a relatively constant momentum unloading capability throughout the year. There is an effect for the techniques described below for when a thruster fails or when the roll transient storage is minimized. Note that the daily total burn time (nominally 30 minutes) does not vary significantly during the year, but the duration of each thruster burn may vary from 3 minutes to 20 minutes through the year.

The total momentum components $\Delta H_1$, $\Delta H_2$, and $\Delta H_3$ are calculated as the sum of the current momentum accumulator momentum, the expected momentum growth from secular disturbance torques, and a momentum target command which will center the momentum variations over the next 24-hour period. These components are always computed in the frame coincident with the spacecraft body axes at the node which is located an angular amount $\Phi$ away from the time when the calculation is made. Accordingly, $\Delta H_1$, $\Delta H_2$, and $\Delta H_3$ are calculated below:

$$\begin{bmatrix} \Delta H_x^{24hrs} \\ \Delta H_y^{24hrs} \\ \Delta H_z^{24hrs} \end{bmatrix} = \begin{bmatrix} \cos\Phi & 0 & \sin\Phi \\ 0 & 1 & 0 \\ -\sin\Phi & 0 & \cos\Phi \end{bmatrix} \left( \begin{bmatrix} H_x \\ H_y \\ H_z \end{bmatrix}_{RWA}^{now} + (86400\text{sec}) \begin{bmatrix} L_x^d \\ L_y^d \\ L_z^d \end{bmatrix} \right) - \begin{bmatrix} H_x \\ H_y \\ H_z \end{bmatrix}_{RWA}^{Target}$$

where, the $H^{now}$ components represent the momentum stored in the accumulators at position $\Phi$, the $L^d$ terms are estimated torque components for a 24 hour period and are received from estimator 48. $\Delta H^{Target}$ represents a factor which removes any bias stored in the spacecraft 20 during the day and reduces momentum storage requirements. The calculation of $\Delta H$ is preferably done twice each day before each node. In addition, $$\begin{bmatrix} H_x \\ H_y \\ H_z \end{bmatrix}_{RWA}^{Target} \cong \frac{(86400\text{sec})}{2\sin(2\alpha + \epsilon_e + \epsilon_w)} \begin{bmatrix} k_w c_w s_e + k_e c_e s_w & 0 & (k_e - k_w) c_e c_w \\ 0 & k_w c_e s_w + k_e c_w s_e & 0 \\ (k_e - k_w) s_e s_w & 0 & k_w c_e s_w + k_e c_w s_e \end{bmatrix} \begin{bmatrix} L_x^d \\ L_y^d \\ L_z^d \end{bmatrix}$$

where: $s_w=\sin(\alpha+\epsilon_w)$, $s_e=\sin(\alpha+\epsilon_e)$, $c_w=\cos(\alpha+\epsilon_w)$, $c_e=\cos(\alpha+\epsilon_e)$. $\alpha$ and $\theta$ are the nominal thruster angles which are normally 13° and 45°, respectively. Furthermore, the distribution factors: $k_w=D_w^{now}/(D_w^{now}+D_w^{next})$, $k_e=D_e^{now}/(D_e^{now}+D_e^{next})$, where $D_w$ and $D_e$ denotes $D_1$ and $D_2$ respectively if at the descending node (southwest and southeast burn durations) or $D_3$ and $D_4$ respectively if at the ascending node (northwest and northeast burn durations). The superscripts now and next refer to the burn durations at the present burn location and the next burn location, respectively.

One way to dump the accumulated momentum is to use gimballed thrusters 36, 38, 40 and 42. Preferably, the gimballed thrusters each use 3-jackscrew mechanism that provides a 3-for-2 redundancy should one of the jackscrews fail. Each thruster can be gimballed in two axes about its thrust vector (up to ±14°) so that each thruster burn can produce dumping torques orthogonal to the thrust vector. This dumping plane can nominally be described with respect to the spacecraft frame $\{x,y,z\}$ as the plane orthogonal to the vector (y–z) for the south thrusters 38, 40 and a plane orthogonal to the vector (y+z) for the north thrusters 36, 42. Inertially, however, because the ascending (North) and descending (South) burns are separated by 12 hours, these planes are nearly coincident, and the dumping capability is severely limited along the inertial thrust vector.

Roll torques (with minimum yaw coupling) are produced by gimballing the thrusters in the North-South direction by an angular amount $\rho$. Gimballing in the East-West direction by an angular amount $\gamma$, produces a combination of pitch and yaw torques (with minimum roll coupling). The capability for dumping momentum along the inertial thrust vector relies on the East-West slew angle (typically 10°–13°) of the thrusters 36, 38, 40, 42. Such an approach requires a roll torque during the northwest burn which is opposite in polarity from the roll torque during the northeast burn, such that the sum of the torques sum produce a yaw torque in the inertial frame. This capability is reduced, however, by the yaw torques produced by the pitch dumping. This yaw dump capability can be increased significantly by moving the burns away from the node by perhaps up to 30° (which effectively increases the coupling of roll torques into yaw).

Furthermore, assuming that the roll/yaw dumping is distributed between the nodes based on roll/yaw dumping capability to minimize the gimbal angle, and pitch dumping is distributed between the nodes to allow for removal of entire yaw by-product momentum at the same node, then $\Delta H$ can be expressed as follows:

$$\begin{bmatrix} \Delta H_x^{now} \\ \Delta H_z^{now} \end{bmatrix} = \begin{bmatrix} c_w & c_e \\ -s_w & s_e \end{bmatrix} \begin{bmatrix} k_w & 0 \\ 0 & k_e \end{bmatrix} \begin{bmatrix} c_w & c_e \\ -s_w & s_e \end{bmatrix}^{-1} \begin{bmatrix} \Delta H_x^{24hrs} \\ \Delta H_z^{24hrs} \end{bmatrix}$$

-continued $$\Delta H_y^{now} = \begin{bmatrix} 0 \\ 1 \end{bmatrix}^T \begin{bmatrix} c_w & c_e \\ -s_w & s_e \end{bmatrix} \begin{bmatrix} k_w & 0 \\ 0 & k_e \end{bmatrix} \begin{bmatrix} c_w & c_e \\ -s_w & s_e \end{bmatrix}^{-1} \begin{bmatrix} 0 \\ \Delta H_y^{24hrs} \end{bmatrix}$$

this can be reduced to the following matrix form:

$$\begin{bmatrix} \Delta H_x^{now} \\ \Delta H_y^{now} \\ \Delta H_z^{now} \end{bmatrix} =$$

$$\frac{1}{\sin(2\alpha + \varepsilon_e + \varepsilon_w)} \begin{bmatrix} k_w c_w s_e + k_e c_e s_w & 0 & (k_e - k_w) c_e c_w \\ 0 & k_w c_e s_w + k_e c_w s_e & 0 \\ (k_e - k_w) s_e s_w & 0 & k_w c_e s_w + k_e c_w s_e \end{bmatrix} \begin{bmatrix} \Delta H_x^{24hrs} \\ \Delta H_y^{24hrs} \\ \Delta H_z^{24hrs} \end{bmatrix}$$

Figure 8:
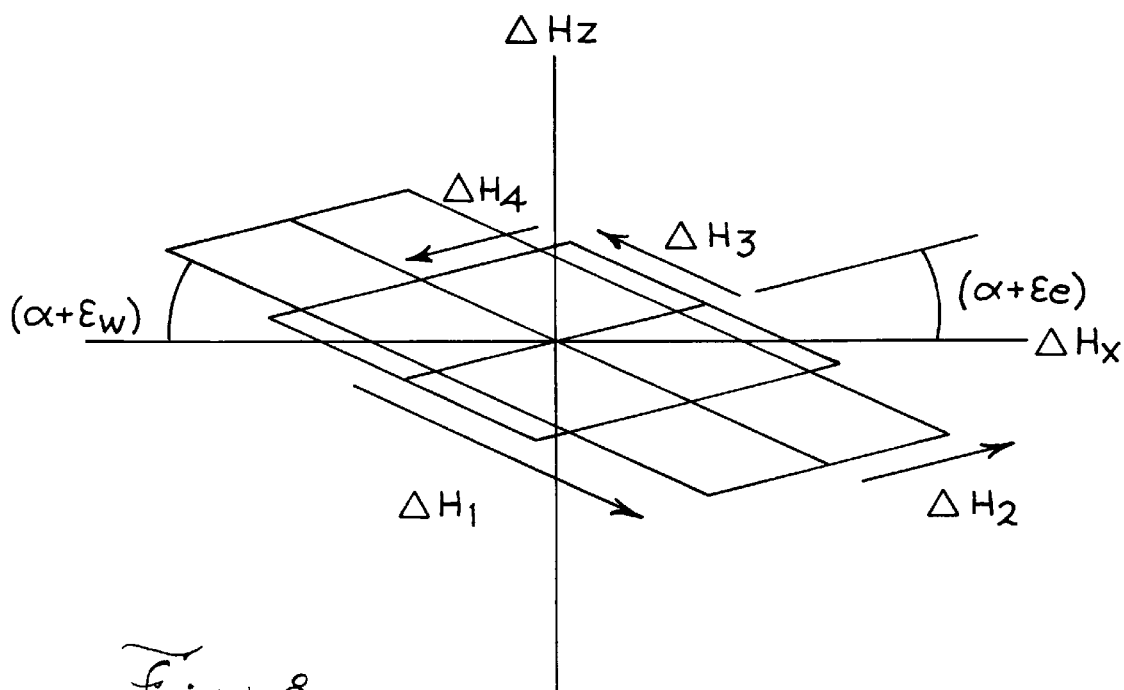
FIG. 8 shows the roll/yaw dumping capability at each of the two nodes and the effect of burn time distribution on dumping capability.

Note that this distribution equation assumes that the roll/yaw byproduct from pitch dumping is purely along the z-axis. This momentum component may diverge from the z-axis by up to an angular amount ($\alpha + \epsilon$) depending on burn distribution and $\delta_{yz}$ as described below. Also, note that FIG. 8 shows the roll/yaw dumping capability at each of the two nodes and the effect of burn time distribution on dumping capability.

The calculated values for $\Delta H$ and the stored $\Delta V$ values are fed to a momentum control 62 where the burn parameters $\epsilon_e$, $\epsilon_w$, $D_1$, $D_2$, $D_3$, $D_4$ and the torque commands L at each burn are calculated. Since the calculation of the torque commands and burn duration times depend on the value of the other, an iteration is performed to calculate both quantities. The final calculated values for the burn durations and the torque commands are those which give stable solutions during the iteration process. The torque commands are for torques about 2-axes in the satellite frame which are computed such that gimbal angles $\rho, \gamma$ are minimized. The burn commands or durations are sent to a thruster sequencer 64 which uses the burn commands to send commands to the thrusters 36, 38, 40, 42 where the signals control the fuel valves and thruster power for each thruster. The torque commands are sent to a momentum dumping controller 66. In the case of dumping momentum via the gimballed thrusters, controller 66 uses the torque commands in combination with a torque feedback signal generated by an estimator 68. The torque feed back signal is representative of an estimate of the torque error in the thrusters. Estimator 68 estimates the torque error based on the attitude of the spacecraft 20 as determined by an internal reference unit (IRU) 70 and a spacecraft dynamics processor 72. The IRU 70 typically consists of a gyro which acts as a rate sensor for estimating the body and angular rates of the spacecraft 20.

The spacecraft dynamics processor contains data regarding the physical characteristics of the spacecraft 20 and calculates the attitude and orbital dynamics of the spacecraft 20 based on receiving a torque signal 74 representative of the torques 76 and 78 generated by the thrusters and the gimbaled thruster platform, respectively, and extraneous torques 80 exerted on the spacecraft 20, which include torques caused from solar, radio-frequency, thruster platform stepping, thrust variation and burn timing factors. Besides the IRU 70, the spacecraft dynamics processor 72 sends a spacecraft dynamics signal 56 to the ground station to be processed by the Kalman filter 54, as mentioned previously. Note that the thruster torque signal 76 is fed back to thruster sequencer 64 so that the telemetry of the thrusters can be monitored and used to adjust the burn durations for arcing.

Momentum control 62 determines the torque commands from the relationship below:

$$\begin{bmatrix} \Delta H_x^{now} \\ \Delta H_y^{now} \\ \Delta H_z^{now} \end{bmatrix} = \begin{bmatrix} D_w^{now} c_w & D_e^{now} c_e & D_w^{now} s_w \cos\theta & -D_e^{now} s_e \cos\theta \\ -D_w^{now} s_w & D_e^{now} s_e & D_w^{now} c_w \cos\theta & D_e^{now} c_e \cos\theta \\ 0 & 0 & -D_w^{now} \sin\theta & -D_e^{now} \sin\theta \end{bmatrix} \begin{bmatrix} L_{xz1} \\ L_{xz2} \\ L_{yz1} + \delta_{yz} \\ L_{yz2} - \delta_{yz} \end{bmatrix}$$

This can be rewritten as follows, because $\delta_{yz}$ is determined a priori in a well known manner:

$$\begin{bmatrix} \Delta H_x^{now} \\ \Delta H_y^{now} \\ \Delta H_z^{now} \end{bmatrix} = \begin{bmatrix} D_w^{now} c_w & D_e^{now} c_e & \cos\theta(D_w^{now} s_w - D_e^{now} s_e) \\ -D_w^{now} s_w & D_e^{now} s_e & \cos\theta(D_w^{now} c_w + D_e^{now} c_e) \\ 0 & 0 & -\sin\theta(D_w^{now} + D_e^{now}) \end{bmatrix}$$

$$\begin{bmatrix} L_{yz1} \\ L_{yz2} \end{bmatrix} =$$

$$\frac{1}{\sin\theta(D_w^{now} + D_e^{now})} \begin{bmatrix} -\Delta H_y^{now} + 2D_e^{now} \delta_{yz} \sin\theta \\ -\Delta H_y^{now} - 2D_w^{now} \delta_{yz} \sin\theta \end{bmatrix} \begin{bmatrix} L_{xz1} \\ L_{xz3} \\ L_{yz} \end{bmatrix} + \delta_{yz} \begin{bmatrix} \cos\theta(D_w^{now} s_w + D_e^{now} s_e) \\ \cos\theta(D_w^{now} c_w - D_w^{now} c_e) \\ -\sin\theta(D_w^{now} - D_e^{now}) \end{bmatrix}$$

$$\begin{bmatrix} L_{xz1} \\ L_{xz2} \end{bmatrix} = \frac{1}{\sin(2\alpha + \varepsilon_e + \varepsilon_w)} \begin{bmatrix} \frac{s_e}{D_w^{now}} & \frac{-c_e}{D_w^{now}} \\ \frac{s_w}{D_e^{now}} & \frac{c_w}{D_e^{now}} \end{bmatrix} \begin{bmatrix} \Delta H_x^{now} - \cos\theta(L_{yz1} D_w^{now} s_w - L_{yz2} D_e^{now} s_e) \\ \Delta H_z^{now} - \cos\theta(L_{yz1} D_w^{now} c_w + L_{yz2} D_e^{now} c_e) \end{bmatrix}$$

where: pitch differential torque, $\delta_{yz}$ is nominally zero and can be used to reduce the $\rho$ gimbal angle at the cost of increased gimbal angle $\gamma$ (see below), and nominal xenon thruster platform cant angle, $\theta=45°$ for $D_3$ & $D_4$ burns, and $\theta=-45°$ for $D_1$ & $D_2$ burns.

All the previous calculations for momentum and torques are performed at a position $\Phi$ (see FIG. 4) located prior to reaching the burn location. However, just prior to the burn location a mathematical transformation of the torques is performed. Since the above-mentioned 2-axis torque commands have been calculated in the thruster frame, they should be resolved once for each burn into 3-axis torque commands (in the spacecraft frame). This transformation is given below:

$$\begin{bmatrix} L_{xi} \\ L_{yi} \\ L_{zi} \end{bmatrix} = \begin{bmatrix} \sin\theta\cos\alpha & \pm\cos\theta\sin\theta\sin\alpha \\ 0 & \pm(\sin\theta)^2 \\ \pm\sin\theta\sin\alpha & \pm\cos\theta\sin\theta\cos\alpha \end{bmatrix} \begin{bmatrix} L_{xzi} \\ L_{yzi} \end{bmatrix}$$

where burn number, i, is equal to 1 or 2. When i=1 that represents that a torque is for either a northwest burn or a southwest burn. Similarly, i=2 represents the torque for either a northeast or a southeast burn.

Also, just prior to the burn location, the thruster platform is stepped into position and a closed-loop gimbal command is performed throughout each burn to null torque error, using a 2×3 pseudo-inverse transformation matrix. A good approximation is shown below in which the quantities are in deg/Nm and would be calibrated once in each orbit:

$$\begin{bmatrix} \Delta\rho \\ \Delta\gamma \end{bmatrix} = \begin{bmatrix} k_{11} & k_{12} & k_{13} \\ k_{21} & k_{22} & k_{23} \end{bmatrix} \begin{bmatrix} \Delta L_x \\ \Delta L_y \\ \Delta L_z \end{bmatrix} = \begin{bmatrix} -180 & 0 & 0 \\ 0 & \pm 140 & \pm 110 \end{bmatrix} \begin{bmatrix} \Delta L_x \\ \Delta L_y \\ \Delta L_z \end{bmatrix}$$

While a burn is performed, there is a gimbal command which limits the calculated values for the gimbal angles to lie between $+/-\gamma_{max}$, $\rho_{max}$, where $\gamma_{max}$, $\rho_{max}$ represent the maximum gimbal angles which are structurally possible for the gimbaling mechanisms on the thruster platform.

Momentum dumping control 66 also prioritizes or controls which momentum accumulators are dumped or momentum dumpers are activated, when the momentum accumulators are dumped, when the momentum dumpers are activated and how much momentum is dumped by each momentum accumulator or momentum dumper. In order to accomplish this level of control, the momentum dumping control 66 will prioritize and weight the commands sent to each momentum accumulator. Furthermore, the momentum accumulators may employ either bang-bang or proportional controllers.

There are several ways to dump momentum, besides gimbaled thrusters, which may be available on spacecraft 20, such as magnetic torquers 46, chemical thrusters, solar panels 28 and momentum or reaction wheels 45. Momentum dumping control 66 sends signals to one or more of the momentum accumulators and dumpers so that the appropriate amount of momentum is dumped.

The dumping of momentum by reaction wheels 45 is well known and understood in the art.

In the case of a magnetic torquer, it can have several forms including either a magnetic torquer coil or magnetic torquer bars. A magnetic torquer coil would generally be mounted on the anti-nadir face of the spacecraft in the roll-pitch plane. A voltage would be applied to this large coil such that it produces a magnetic dipole which interacts with the Earth's magnetic field (which is generally directed towards the South). This combination produces body torques which are generally only directed along the roll axis of the spacecraft. Magnetic torquer bars would be similar units which can produce dipoles in any axis, however for this orbit-normal spacecraft attitude, they would also produce torques only about the roll axis. They must be applied at the right time of day when the roll axis is properly located with respect to the disturbance torque which is to be counteracted (the sun is the dominant source for this disturbance torque which rotates once per day in the roll-yaw plane).

Regarding chemical thrusters, they traditionally can be controlled about any axis, but also may result in higher pointing transients (and is more expensive of a system in hardware and fuel costs). This is traditionally used in thresholding scheme whereby a thrust pulse would be used to dump momentum when that axis exceeds a certain threshold. Pitch disturbances are traditionally dumped with chemical propulsion.

Solar tacking of a solar panel can be used to dump momentum by commanding offset angles to the solar wing drives to also produce torques in the roll-yaw plane. Solar tacking and magnetic torquing might only be used in conjunction with a xenon propulsion system if the disturbance torques were exceptionally high (such as for a very asymmetric spacecraft design).

The difficulty of integrating these multiple momentum dumping schemes together is in accounting for their different periods of operations and their different capabilities in different axes. Momentum dumping control 66 can take into account the different momentum dumping capabilities of the above-mentioned momentum dumpers and formulate one or more methods of coordinating the dumping of momentum off the spacecraft 20.

One method would be for the momentum dumping control 66 to predict the amount of $H_z$ (byproduct) momentum which will be produced by the electronic thrusters when dumping $H_y$. During the worst-case time of year it is the $H_z$ momentum command which will risk saturating the capability of the electronic thrusters. The portion of $H_z$ which exceeds the electronic thrusters' capability can then be commanded to a solar tacking (or magnetic torquing) controller (not shown).

Figure 10:
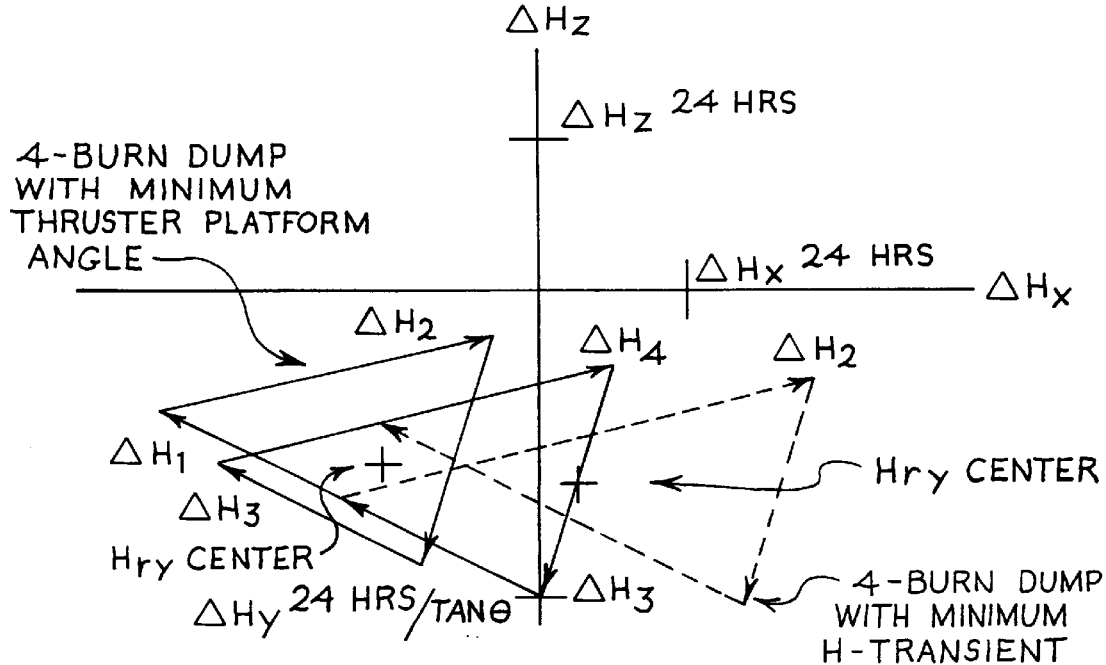
FIG. 10 shows a comparison of the two dump strategies where the transient momentum is more apparent.

Another role of momentum dumping control 66 would be to prevent allowing the multiple dumping mechanisms to confuse or even fight against each other. One example is shown in FIG. 10 where it is shown that the thruster momentum produced in the xz plane is not directed purely against the targeted disturbance torque, but is composed of multiple skewed momentum commands. Each thruster burn stores undesirable momentum in the momentum accumulators that will be removed at the next burn. If both thrust burns and solar tacking were allowed to sample the momentum accumulators to determine the amount of momentum to dump, then solar tacking would not know how much of the current momentum is temporary (and will be removed by a subsequent thruster burn). The momentum dumping control 66 will be responsible for sampling the momentum wheels and computing dumping commands for all mechanisms.

Various techniques may be used to improve performance for the above-described momentum dumping/stationkeeping technique. For example, the value of $\delta_{yz}$ may be varied throughout the year to minimize transient momentum storage and/or reduce required gimbal angle $\rho$. This parameter can either be controlled by the ground (if it varies slowly through the year) via the equation:

$$\delta_{yz} = \delta_{gnd}\text{sgn}(-\Delta H_x^{24hrs})$$

or, with great difficulty, it can be computed autonomously on the satellite 20, such that pitch dumping is performed possibly at one burn only.

Another avenue for improving the momentum dumping technique is have the pitch distribution computation more accurately predict the roll/yaw byproduct based on burn distribution and or $\delta_{yz}$.

A third improvement would be to increase dumping capability by increasing burn duration symmetry using a stationkeeping strategy which controls eccentricity less tightly. Such an approach may still be amenable to spacecraft collocation.

A fourth improvement is to adopt an alternative algorithm that may be used such that roll transient momentum storage (between each west and east burn) is minimized. This can reduce the momentum storage requirement (possibly require a smaller reaction wheel) at the cost of an increase in thruster platform gimbal range. Such an algorithm may require changing only the distribution factors $k_w$ and $k_e$, which may have values ranging from $1/3$ to $2/3$.

Figure 9:
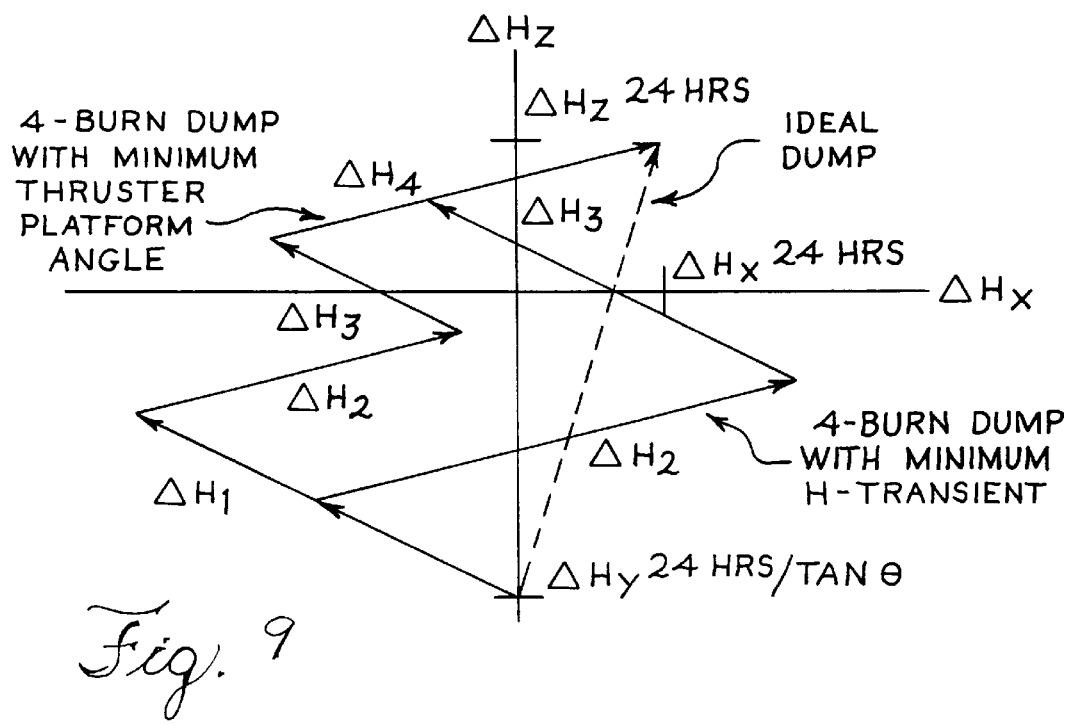
FIG. 9 shows a comparison of two dump strategies of the present invention.

As seen in FIG. 9, both dumping techniques—minimized gimbal angles and minimized transient roll—are compared. This figure regards the scenario of dumping 5,5,10 Nms daily in roll, pitch, and yaw respectively. The first algorithm is optimized for minimum gimbal angle, resulting in four momentum vectors which are proportional to their burn durations. The cost of this optimization is a 100% increase in the roll transient momentum for the geometry shown above (between the $D_1$ and $D_2$ burns for example) over the alternative algorithm. The second algorithm is optimized for minimum roll transient momentum as is apparent from the more centered excursions of the roll/yaw momentum vector from the ideal dump trajectory. The cost of this optimization is an increase in required $\rho$ angle for the geometry shown above (50% increase for the $D_2$ burn and 100% increase for the $D_3$ burn). The transient momentum is increased by 5% in roll and decreased by 12% in yaw for this example (unfortunately, the roll axis has the least momentum margin).

Shown in FIG. 10 is another representation of the same dump strategy which better represents the temporal location of the torques (disturbance momentum and pitch dump torques accumulate equally between the two nodes), such that the transient momentum is more readily apparent.

Should one of the thrusters fail or a xenon power conditioner fail, at least 40% more fuel will be required for stationkeeping and momentum management. In particular, a failure of a thruster or a xenon power conditioner requires only one burn to be performed at each of the ascending and descending nodes along with third and fourth burns from the thrusters at a third point in the orbit, as described in U.S. Pat. No. 5,443,231. While a failure of a thruster or a power conditioner requires a variation in the geometry of the above-described stationkeeping/momentum management, the calculations will be similar to those in the non-failure scenario with a more generalized geometric derivation.

In summary, the present invention regards a control system for controlling the orbital position of a spacecraft. The control system of the present invention simultaneously controls the orbital motion and the momentum dumping of a spacecraft which leads to improved fuel efficiency on the spacecraft which allows a spacecraft to perform stationkeeping solely via ion propulsion thrusters and, thus, reduces the need for bipropellant fuel or thrusters.

The foregoing description is provided to illustrate the invention, and is not to be construed as a limitation. Numerous additions, substitutions and other changes can be made to the invention without departing from its scope as set forth in the appended claims.

We claim:

1. A method of simultaneously controlling East/West and North/South positioning and unloading momentum of a spacecraft while orbiting the Earth, said spacecraft having a thruster array, an on-board processor capable of receiving stationkeeping commands from a ground station located on the Earth that correspond to desired spacecraft velocity changes and capable of calculating thruster firing parameters necessary to meet both stationkeeping and momentum dumping requirements of said spacecraft, and a momentum accumulator, said method comprising the steps of:

receiving desired spacecraft velocity changes from said ground station;

moving said spacecraft towards a node of said orbit;

calculating, solely using said on-board processor, thruster firing parameters necessary to meet said stationkeeping requirements and momentum dumping requirements;

firing a thruster of said thruster array at a predetermined position on said orbit, separate from said node, so as to control the orbital position of said spacecraft, wherein said predetermined position is calculated by said on-board processor; and simultaneously dumping momentum from said momentum accumulator at said predetermined position and while said thruster is being fired so that any loss in control in the attitude of said spacecraft is reduced.

2. The method of claim 1, wherein said step of dumping momentum comprises gimballing a thruster of said thruster array.

3. The method of claim 2, wherein said fired thruster and said gimballed thruster are one and the same.

4. The method of claim 1, further comprising the step of continuously monitoring momentum stored by said momentum accumulator.

5. The method of claim 1, wherein said spacecraft comprises a first momentum dumper and a second momentum dumper, said method comprising the steps of:

continuously monitoring the amount of momentum stored by said momentum accumulator; and wherein said step of dumping momentum comprises dumping momentum from one or both of said first and second momentum dumpers in response to the amount of momentum stored by said momentum accumulator.

6. The method of claim 1, wherein the location of said predetermined position is determined based upon a predetermined amount of momentum which needs to be dumped from said spacecraft during said momentum dumping step.

7. The method of claim 6, wherein said predetermined position is located approximately 30° from said node.

8. A method of simultaneously controlling East/West and North/South positioning and unloading momentum of a spacecraft while orbiting the Earth, said spacecraft having first, second, third and fourth thrusters, an on-board processor capable of receiving stationkeeping commands from a ground station located on the Earth that correspond to desired spacecraft velocity changes and capable of calculating thruster firing parameters necessary to meet both stationkeeping and momentum dumping requirements of said spacecraft, and a momentum accumulator, said method comprising the steps of:

moving said spacecraft towards a node of said orbit;

calculating, solely using said on-board processor, thruster firing parameters necessary to meet said stationkeeping requirements and momentum dumping requirements;

firing said first thruster at a predetermined position on said orbit, separate from said node, so as to control the orbital position of said spacecraft, wherein said predetermined position is calculated by said on-board processor; and simultaneously dumping momentum from said momentum accumulator at said predetermined position and while said first thruster is being fired so that any loss in control in the attitude of said spacecraft is reduced.

9. The method of claim 8, wherein the location of said predetermined position is determined based upon a predetermined amount of momentum which needs to be dumped from said spacecraft during said momentum dumping step.

10. The method of claim 9, wherein said first, second, third and fourth thrusters are arranged at a northwest corner, a northwest corner, a southwest corner and a southeast corner, respectively, of a rectangular array.

11. The method of claim 10, further comprising the steps of:

moving said spacecraft past said node of said orbit;

firing said second thruster at a second predetermined position on said orbit, separate from said node, so as to control the orbital velocity and attitude of said spacecraft; and dumping momentum from said momentum accumulator at said second predetermined position and while said second thruster is being fired so that any loss in control in the attitude of said spacecraft is reduced.

12. The method of claim 11, wherein said second predetermined position is located up to 30° from said node.

13. The method of claim 11, further comprising the steps of:

moving said spacecraft towards a second node of said orbit;

firing said third thruster at a third predetermined position on said orbit, separate from said second node, so as to control the orbital velocity and attitude of said spacecraft; and dumping momentum from said momentum accumulator at said third predetermined position and while said third thruster is being fired so that any loss in control in the attitude of said spacecraft is reduced.

14. The method of claim 13, wherein said third predetermined position is located up to 30° from said second node.

15. The method of claim 13, further comprising the steps of:

moving said spacecraft past said second node of said orbit;

firing said fourth thruster at a fourth predetermined position on said orbit, separate from said second node, so as to control the orbital position of said spacecraft; and dumping momentum from said momentum accumulator at said fourth predetermined position and while said fourth thruster is being fired so that any loss in control in the attitude of said spacecraft is reduced.

16. The method of claim 15, wherein said fourth predetermined position is located up to 30° from said second node.

17. The method of claim 8, wherein said predetermined position is located up to 30° from said node.

18. A method of simultaneously controlling East/West and North/South positioning and unloading momentum from a momentum accumulator on a spacecraft, said spacecraft including an on-board processor capable of receiving stationkeeping commands from a ground station located on the Earth that correspond to desired spacecraft velocity changes and capable of calculating thruster firing parameters necessary to meet both stationkeeping and momentum dumping requirements of said spacecraft, a first momentum dumper and a second momentum dumper, said method comprising the steps of:

monitoring the amount of momentum stored by said momentum accumulator;

calculating thruster firing parameters necessary to meet both stationkeeping and momentum dumping requirements of said spacecraft solely by utilizing said on-board processor; and activating one or both of said first and second momentum dumpers to simultaneously dump momentum from said momentum accumulator in response to the momentum dumping requirement calculated by said on-board processor.

19. The method of claim 18, wherein said first momentum dumper comprises a thruster.

20. The method of claim 18, wherein said second momentum dumper comprises a gimbaled solar panel.

21. The method of claim 18, wherein said second momentum dumper comprises a magnetic torquer.

* * * * *